United States Patent [19]

Bauerlen et al.

[11] 4,392,383

[45] Jul. 12, 1983

[54] DISTANCE-FREQUENCY TRANSDUCER

[75] Inventors: Hans Bauerlen; Thomas Pfendler, both of Gerlingen; Berthold Wocher, Leonberg, all of Fed. Rep. of Germany

[73] Assignee: Robert Bosch GmbH, Stuttgart, Fed. Rep. of Germany

[21] Appl. No.: 244,783

[22] Filed: Mar. 17, 1981

[30] Foreign Application Priority Data

Mar. 26, 1980 [DE] Fed. Rep. of Germany ....... 3011594
Oct. 7, 1980 [DE] Fed. Rep. of Germany ....... 3037802

[51] Int. Cl.³ .......................... G01L 9/12; H01G 7/00
[52] U.S. Cl. ........................................ 73/724; 73/718; 331/65; 361/283
[58] Field of Search ...................... 73/724, 718, 708; 331/65, 143, 108 D; 361/283

[56] References Cited

U.S. PATENT DOCUMENTS

| 3,808,480 | 4/1974 | Johnston | 73/718 |
| 3,883,826 | 5/1975 | Kirby | 331/65 |
| 4,158,217 | 6/1979 | Bell | 73/718 |
| 4,177,680 | 12/1979 | Coleman | 73/718 |
| 4,295,376 | 10/1981 | Bell | 73/724 |

Primary Examiner—Donald O. Woodiel
Attorney, Agent, or Firm—Frishauf, Holtz, Goodman & Woodward

[57] ABSTRACT

The distance-frequency transducer includes a capacitor whose capacitance changes as a function of movement of one electrode relative to the other. The movement is controlled by the parameter to be measured, as, for example, the pressure in a pressure pickup. The capacitance determines the frequency of an RC oscillator. The output frequency of the oscillator can be calibrated directly in pressure units.

10 Claims, 12 Drawing Figures

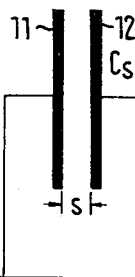
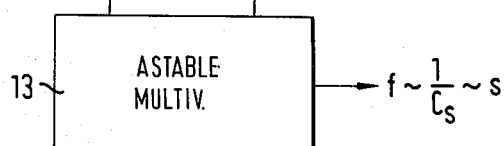
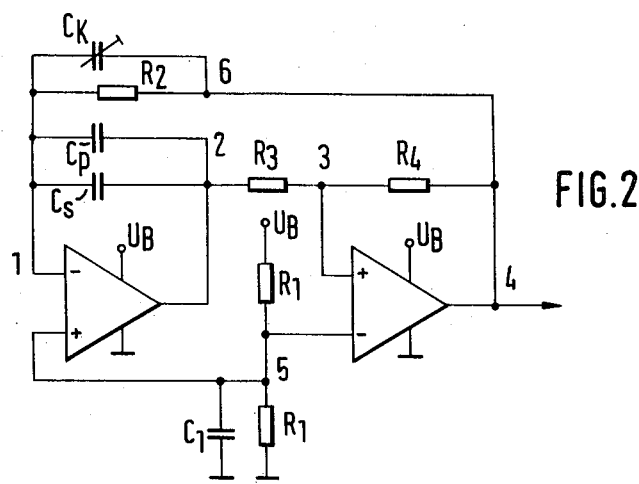
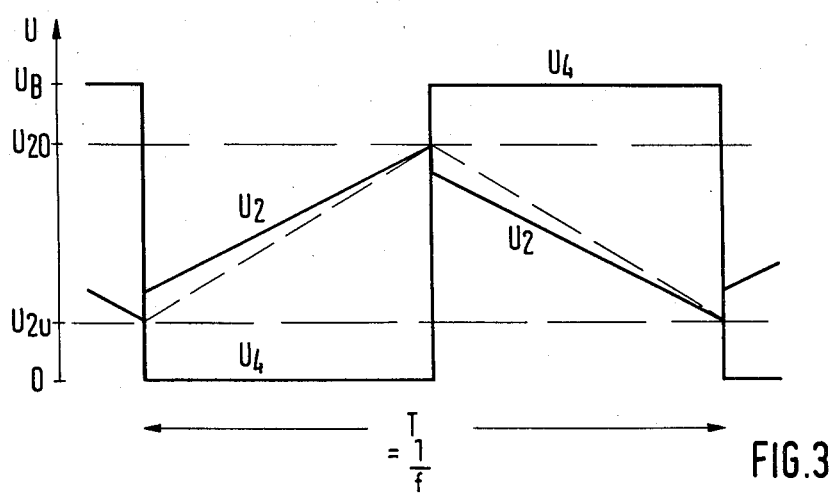

DISTANCE-FREQUENCY TRANSDUCER

The present invention relates to distance-frequency transducers which operate according to the capacitive principle. Transducers of this type include a capacitor whose capacitance C varies as a function of distance between its plates. The latter in turn varies in dependence on the value of the parameter being measured.

BACKGROUND OF THE INVENTION

Distance-frequency transducers are required in many fields including electrical control and measurement. Specifically it is often desirable to have a distance-frequency transducer which encompasses changes in distance of from approximately 0.5 to 10 mm and whose output frequency changes by a factor of more than 10 for such changes in distance.

THE INVENTION

In accordance with the present invention, the capacitance of a capacitor having at least one electrode movable with respect to another in accordance with the value of the parameter being measured is made part of an RC oscillator circuit. Preferably, an astable multivibrator is used as RC oscillator.

BRIEF DESCRIPTION OF THE DRAWINGS

FIG. 1 is a schematic diagram illustrating the operating principles of the present invention;

FIG. 2 is a more detailed circuit diagram of the RC oscillator of the present invention;

FIG. 3 shows the variation of voltages at selected points of the circuit of FIG. 2 during one cycle;

DESCRIPTION OF THE PREFERRED EMBODIMENT

Figure 4:
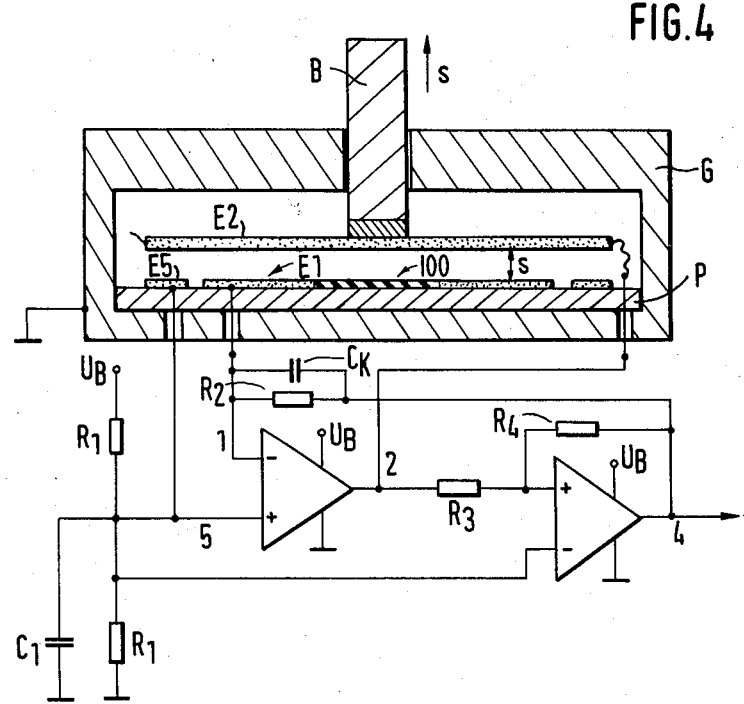
FIG. 4 is a partially sectional view of the pressure pickup used as measuring capacitor in the present invention.

The basic principle of the present invention is illustrated in FIG. 1. Two plates 11 and 12 are shown which constitute the electrodes of a capacitor. The capacitance $C_S$ varies as a function of the distance s between the plates. Specifically one of the plates of the capacitor may be coupled to a member of an internal combustion engine, such as, for example, the membrane of a pressure pickup. Electrodes 11 and 12 are connected to an astable multivibrator 13 which is constructed in the integrated circuit technique and furnishes an output frequency which is inversely proportional to the capacitance and therefore directly proportional to the distance between the plates.

In a practical embodiment of such a variable capacitor, relatively small capacitances $C_S$ in the region of 0.5 to 50 pf result. Since the capacitance changes are so small, the RC oscillator 13 must be very carefully designed so that the desired frequency changes are not masked by interference effects such as parasitic circuit capacitances, temperature variation of the circuit, leakage currents, etc.

An RC oscillator suitable for integrated circuit construction is shown in FIG. 2. This type of construction fulfills the above-mentioned requirements, is relatively inexpensive, has a linear output which is stable with respect to temperature changes and not sensitive relative to supply voltage variation.

The RC oscillator consists of a series connected circuit of an integrator and a Schmitt trigger circuit having a suitable feedback.

The circuit between terminals 1 and 2 is a field effect operational amplifier connected as an integrator. The capacitance $C_S$ which depends on the distance between plates, and the parasitic capacitance $C_p$ assumed to be in parallel with it, together with the resistance $R_2$ determine the integration time constant. This is given by equation 1.

The capacitance $C_K$ of the small trimmer capacitor allows compensation for the undesired effect of $C_p$ on the characteristic transfer curve. This is described in greater detail below.

The circuit between reference numerals 2 and 4 constitutes a rapidly acting comparator which, with the aid of resistors $R_3$ and $R_4$, forms a Schmitt trigger having a defined hysteresis. Because the voltage supply is to be asymmetrical, two resistors $R_1$ are used as voltage dividers to fix a potential at a terminal 5 to which the potentials $U_B$ and chassis potential are symmetrical.

Feedback from terminal 4 causes a square wave voltage symmetrical to the voltage at terminal 5, having an on-off ratio of 1:1 and a frequency f varying as a function of $C_{Sn}$ to be generated at that terminal.

FIG. 3 shows the voltage variation with respect to time at terminals 4 and 2 as well as the thresholds $U_{2o}$ and $U_{2u}$ at which the Schmitt trigger switches.

The voltage $U_2$ has a discontinuity at each switching point. This desired effect may be ascribed to capacitor $C_K$ which causes a lead in the voltage $U_2$ and thus compensates for the delayed linear rise of $U_2$ resulting from capacitor $C_p$. (For $C_p = C_k = 0$, the variation of voltage $U_2$ would be along the dashed line.)

The frequency of the oscillator is given by equation 2. It is independent of supply voltage $U_B$ and the effect of capacitance $C_p$ can be eliminated by correct dimensioning of capacitor $C_K$. The desired value of $C_K$ is given in equation 3. When $C_s$ is inversely proportional to the distance between the plates, the frequency will be directly proportional to this distance.

One embodiment of a capacitive distance sensor and its connection to the circuit of FIG. 2 is shown in FIG. 4.

Capacitor plate E1 is circular and is surrounded by a ring-shaped protective electrode E5.

The two electrodes are constituted by a copper coating on a printed circuit board P. The electrodes are insulated relative to metallic housing G which is at ground or chassis potential.

The circular electrode E2 is movable along the path s. The variation in distance s is transmitted by a bolt B which is mounted in a bearing in the housing. The capacitance between E1 and E2 is thus changed. E2 is insulated relative to the bolt. Contact takes places by means of flexible wires. Ring electrode E5 serves two purposes:

It is approximately the same potential as E1 and thus prevents leakage currents from E1 to the housing. Furthermore, the presence of the ring electrode causes a homogenous electric field to exist between E2 and E1, even at the edge of E1. The variation of $C_S$ is thus inversely proportional to the distance variation.

Because of the particular characteristics of the circuit used, the considerable capacitances between E2 and G (ground potential), E1 and G, E1 and E5 have no effect on the frequency.

Copper braid shielding which covers the measuring capacitor and may be extended to cover the complete circuit prevents both radiation to and radiation from the equipment.

Other embodiments of the present invention are illustrated in FIGS. 5 to 11. In each of these, the capacitance C is formed by a metallic membrance of a pressure pickup, the membrance being movable as a function of pressure relative to a second electrode. A concentric corrugated membrane pressure pickup may be used whose upper surface constitutes one of the two capacitor electrodes. It is positioned relative to the second electrode in such a way that changes in pressure cause a change in the distance between the two electrodes.

In a further embodiment the second electrode may have an inner area in which at least one zone is provided which is free of the conductive electrode material. The equipment can be adjusted to have the desired (e.g. linear) variation of oscillator frequency as a function of pressure by means of such a zone. Preferably, the pressure pickup is surrounded by two parts of the housing (G1, G2) which are mounted from the top and the bottom on a printed circuit board on which the second electrode and the oscillator circuit are also mounted. A printed circuit board made of an insulating material may also contain further electrical components applied, for example, by vacuum deposition or metalization.

In a further embodiment of the invention, a trimmer capacitor may be connected in parallel to the measuring capacitance of the pressure pickup and, further, a second capacitor may be provided which is connected in parallel to the charging resistor of the integrator.

Figure 5:
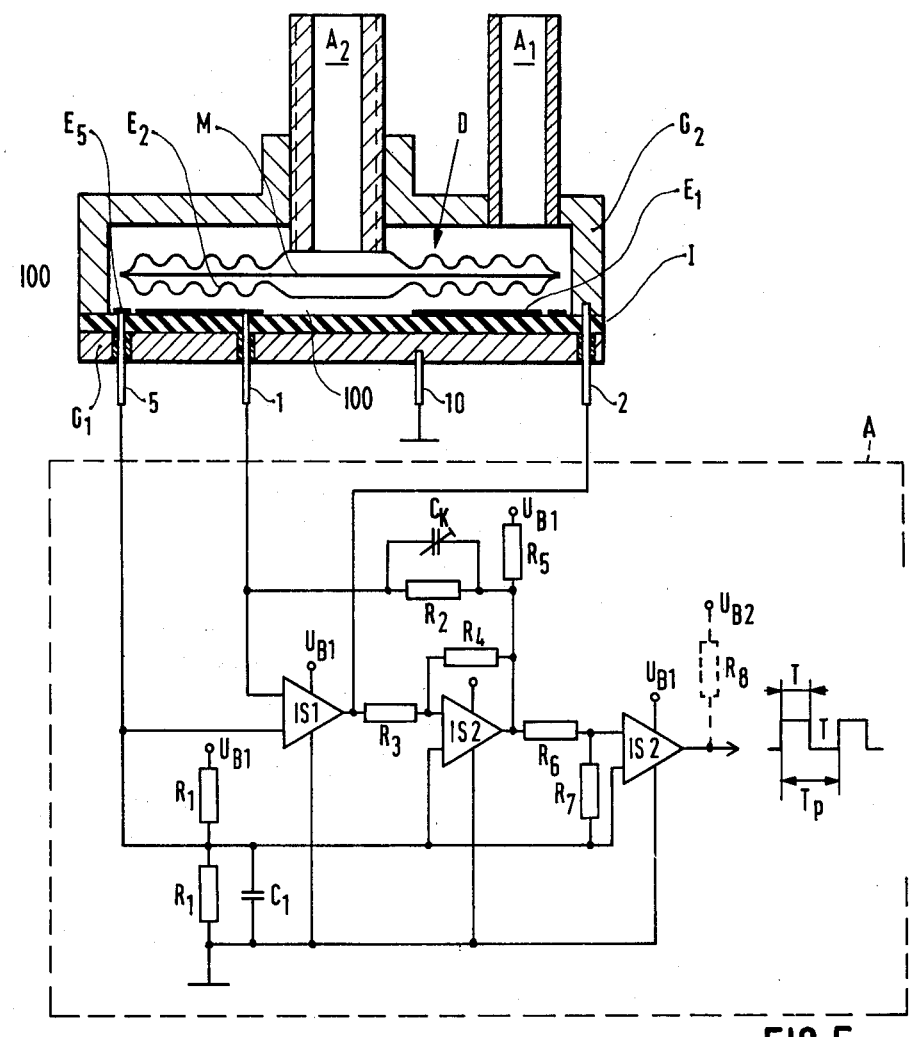
FIG. 5 is an embodiment utilizing a pressure pickup having a corrugated membrane.

In the embodiment of FIG. 5, a plate I of insulating material (fiberglass-epoxy) insulates housing parts G1 and G2 from each other. The housing parts G1 and G2 may be made of aluminum, zinc, or brass. Both parts of the housing are pasted to the plate. Electrode films E1, E5 of highly conductive material are applied to the top surface of the plate. A copper layer having an etched structure applied by a thick film or thin film technique may be used. Electrode connectors 5 and 1 pass tightly through the bottom of the housing.

Housing part G1 is connected at terminal 10 to ground potential. Contact with electrode E2 (the pressure pickup) is made via pin 2 and the upper part G2 of the housing as well as terminal A2. This method of making contact with electrode E2 via G2 has many advantages as to construction and manufacture. However, it must be noted that the upper part G2 of the housing is not at ground potential. It carries a high frequency (less than 100 kHz) AC voltage having a DC component. Capacitive pickup by neighboring circuits may occur. The pressure connection to the intake pipe of an internal combustion engine takes place at A1 or A2 via an insulating flexible tube.

Figure 6:
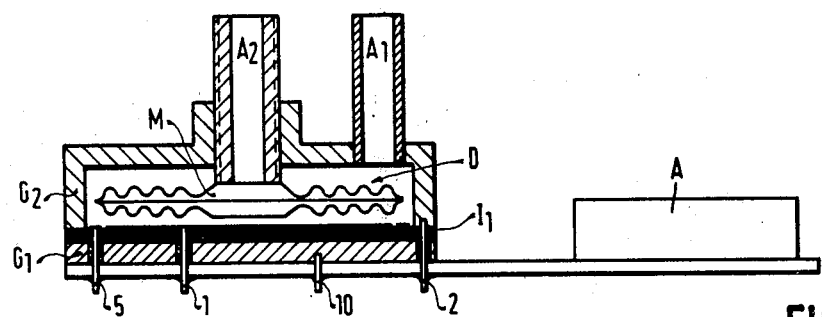
FIGS. 6, 7 and 8 show alternate mounting arrangements for the pressure pickup and the oscillator.

The electronic circuit can either be fastened to a printed circuit board underneath the pressure pickup by means of pins 1, 2, 5, and 10 and provided with a protective cover which also constitutes electrical screening, or the pressure pickup can be soldered onto a printed circuit board as would be a power transistor, the circuit then being mounted right next to the pressure sensor on the same board (FIG. 6).

Figure 8:
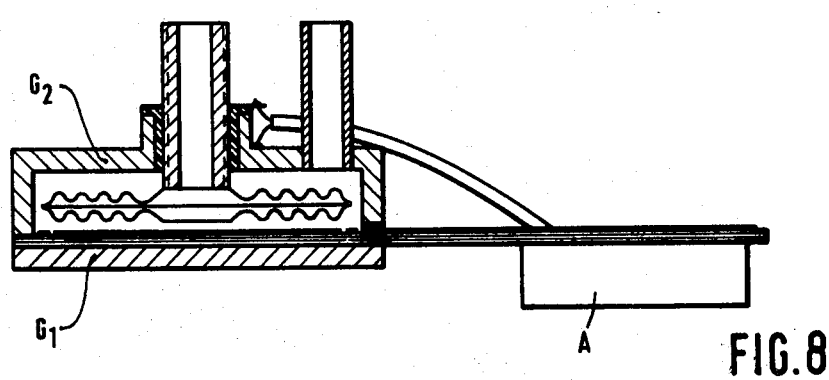

An alternate embodiment is shown in FIG. 8. The printed circuit board with the circuit evaluating the pressure applied to the pressure pickup and, if necessary, additional electronic circuits, is utilized directly as the board carrying the electrode in the pressure pickup. Housing parts G1 and G2 are placed onto the board from above and below. Connection to the electrodes is made by conductive strips in an identation in housing G2 which is then sealed with a potting compound. It is to be particularly noted that in this embodiment the threaded nipple of the pressure pickup is screwed into the housing but insulated by a threaded bushing. The upper part of the housing may be grounded for this embodiment, the pressure pickup being connected by means of a shielded wire and the threaded nipple. Capacitive pickup by other cicuit parts can thus be substantially eliminated.

Figure 9:
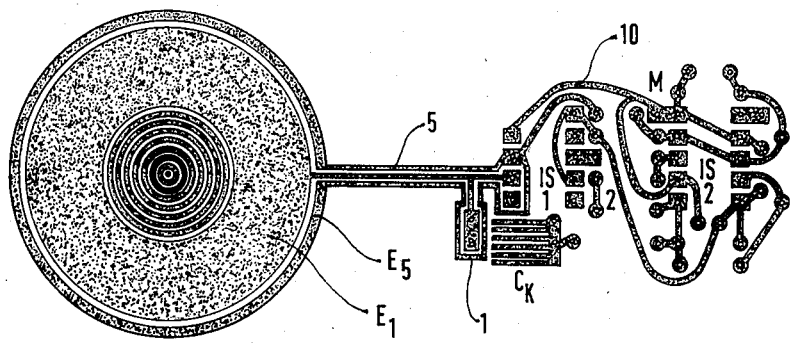
FIG. 9 is a diagram illustrating the layout of the printed circuit board utilized in FIG. 8.

FIG. 9 shows the layout of a pressure pickup plate for the embodiment of FIG. 8.

Figure 7:
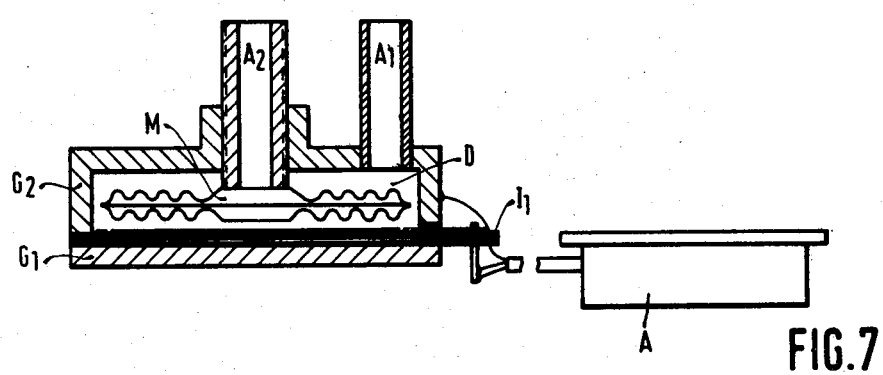

As shown in FIG. 7, the pressure sensor is used in conjunction with a separately mounted electronic circuit, shielded wiring (two individually shielded leads) being used to form the electrical connection.

Figure 10:
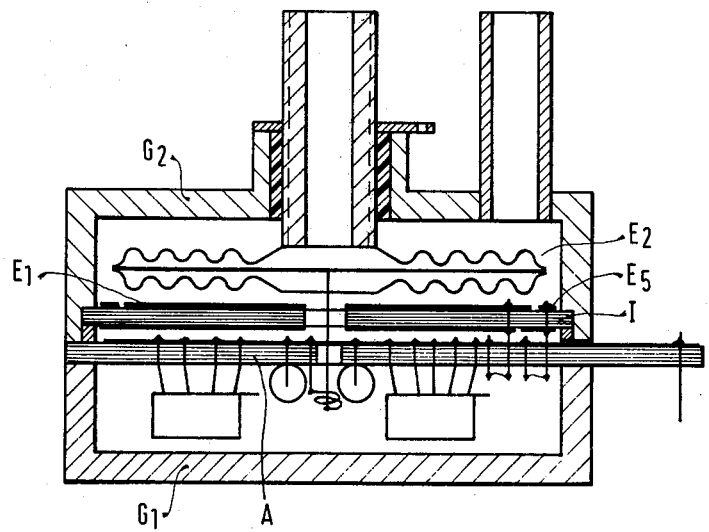
FIG. 10 illustrates an embodiment wherein the measuring capacitor and RC oscillator are enclosed within a single housing.

In the embodiment of FIG. 10, the pressure pickup and the associated electronic circuits are all built into one housing. The board carrying the electrode and the board carrying the circuit are separate units. The connection to the pressure pickup which is insulated from the housing is effected by a soldered pin and a thin spiral connecting wire.

The associated electronic circuitry was explained above with reference to FIG. 1. A more detailed diagram is illustrated in FIG. 5. In FIG. 5, IS1 is an operational amplifier having a field effect input, IS2 is a rapidly acting double comparator whose second stage acts as a driver without feedback. The output (open collector) can be connected to the supply voltage of the subsequent logic circuits by means of resistor $R_8$ and is thus compatible with different logic systems. The on/off ratio of the rectangular output signal is one to one, the frequency f being a measure of the pressure.

Figure 11:
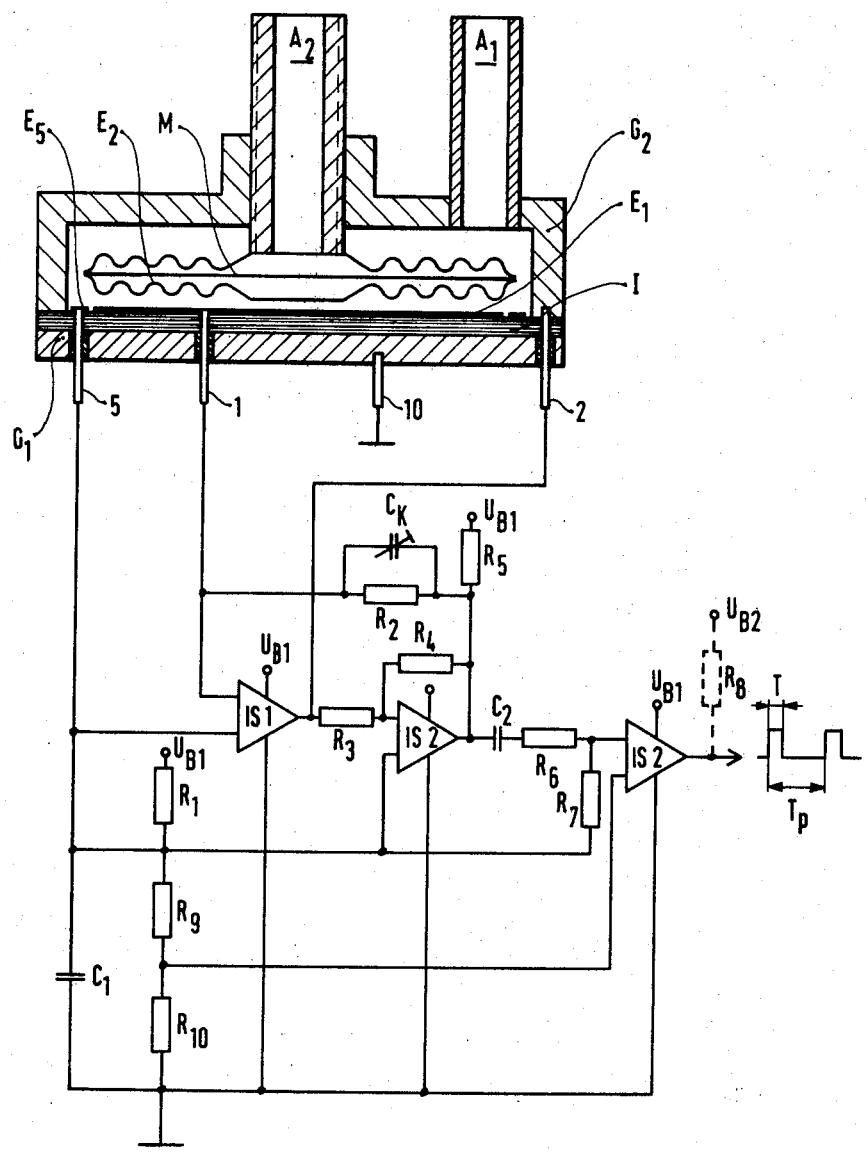
FIG. 11 shows an embodiment of the present invention similar to that of FIG. 5 but producing an output having an asymmetrical on/off ratio.

An additional capacitor can be used to make the second comparator a monostable multivibrator (FIG. 11). In this case, not only the frequency but also the average value of the output voltage is a measure of the pressure. Specifically, the output voltage is given by equation 4.

A fine adjustment of the slope $\Delta f/\Delta p$ of the characteristic curve f(P) can be made either by the resistance ratio $R_3/R_4$ or the absolute value of resistor $R_2$. The frequency $f_0$ is adjusted by movement of the pressure pickup through the threaded nipple. The capacity $C_K$ is adjusted only once for each layout (see FIG. 9). An individual adjustment of $C_K$ is generally not required.

In an experimentally tested embodiment, the construction of FIG. 8 with the layout of FIG. 9 was utilized.

The pressure pickup had a diameter of 38 mm, its characteristic being $\Delta S/\Delta P = 0.2$ cm/bar.

Values of circuit components are listed in Table 1.

The capacitance $C_K$ is constituted by conductive strips parallel to resistor $R_2$.

Figure 12:
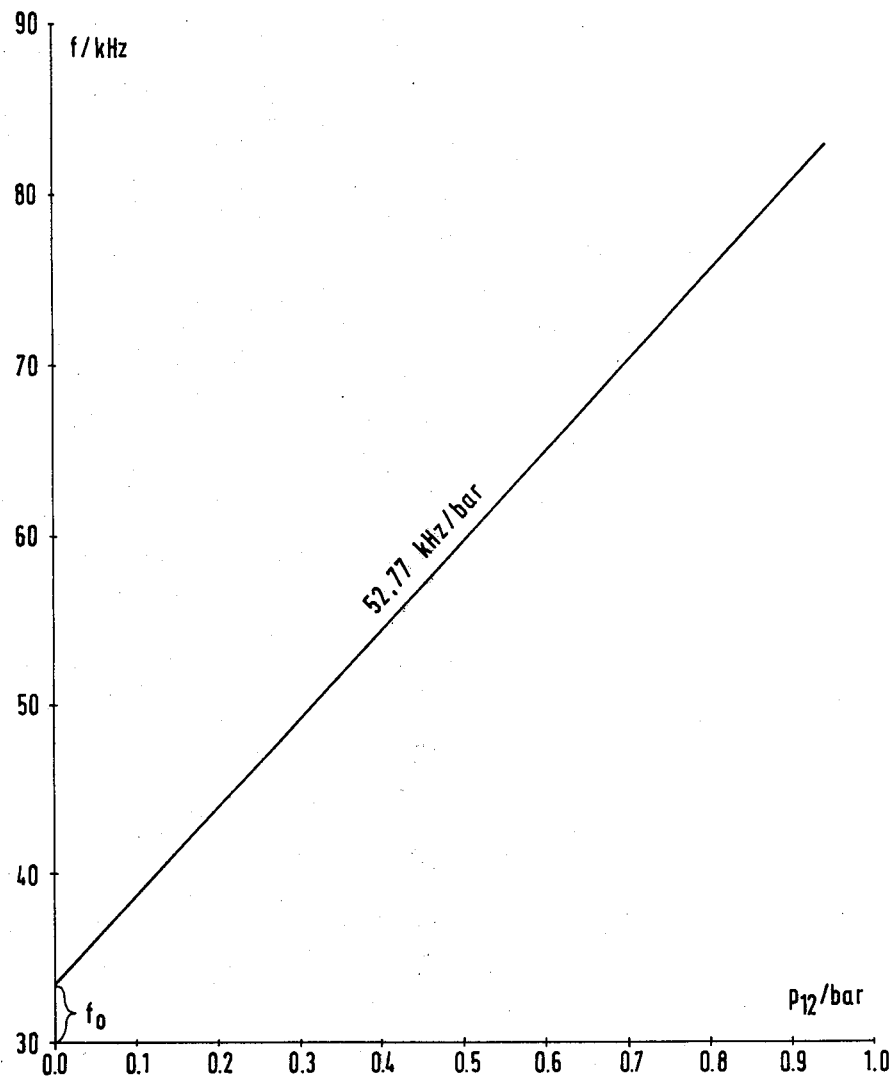
FIG. 12 shows the variation of output frequency as a function of pressure in one embodiment of the invention.

The curve of FIG. 12 shows the characteristic curve of f as a function of pressure p achieved in the above-described embodiment.

EQUATIONS AND TABLE $$T_i = R_2 (C_S + C_p) \quad \text{Equation 1}$$

$$f = \frac{1}{4 R_2 \left( \dfrac{R_3}{R_4} C_S + \dfrac{R_3}{R_4} C_p - C_K \right)} \quad \text{Equation 2}$$

$$\left( C_K = \frac{R_3}{R_4} C_p \right) \quad \text{Equation 3}$$

$$\overline{U} = T \cdot U_{B2} \cdot f \quad \text{Equation 4}$$

TABLE I

| Circuit Component Values: | | |
|---|---|---|
| $R_1 = 2.2k\Omega$ | $R_2 = 2.2M\Omega$ | $1S_1 = $ LF 357 |
| $R_3 = 50k\Omega$ | $R_4 = 100k\Omega$ | $1S_2 = $ LM 319 |
| $R_5 = 5.1k\Omega$ | $R_6 = 470k\Omega$ | |
| $R_7 = 470k\Omega$ | $C_1 = 33nF$ | |

We claim:

1. Pressure transducer comprising
an RC oscillator circuit including
a measuring capacitor having a capacitance (C) varying in dependence on pressure, and determining the frequency of the RC oscillator circuit, said capacitor having
a fixed electrode (E1) and a movable electrode (E2);
wherein the fixed electrode comprises a layer of electrically conductive material surrounding a central area which comprises non-conductive material (100),
and wherein the movable electrode comprises a metallic, corrugated membrane (M) having a surface facing said fixed electrode, said membrane (M) forming a pressure pick-up (D) and being movable relative to said fixed electrode (E1) as a function of pressure applied thereon.

2. A transducer as set forth in claim 1, wherein said RC oscillator circuit means comprises an integrator circuit and a Schmitt trigger circuit.

3. A transducer as set forth in claim 2, wherein said integrator circuit comprises a charging resistor ($R_2$); further comprising a compensating capacitor ($C_K$) connected in parallel to said charging resistor.

4. A transducer as set forth in claim 2, wherein said integrator circuit comprises an operational amplifier having a direct input;
wherein said measuring capacitor has a fixed electrode (E1) and a ring electrode (E5) surrounding said fixed electrode; and further comprising
means for electrically connecting said ring electrode to said direct input of said operational amplifier.

5. A transducer as set forth in claim 1, further comprising a printed circuit board (I); wherein said fixed electrode is on said printed circuit board;
further comprising a housing having a first and second part (G1, G2) enclosing said pressure pickup.

6. A transducer as set forth in claim 1, further comprising a trimmer capacitor ($C_P$) connected in parallel to said measuring capacitor.

7. A transducer as set forth in claim 6, wherein said RC oscillator circuit means comprises an integrated circuit having a charging resistor;
further comprising a compensating capacitor (Ck) connected in parallel to said charging resistor.

8. A transducer as set forth in claim 5, wherein said oscillator circuit means is mounted on said printed circuit board (1).

9. A transducer as set forth in claim 5, wherein said printed circuit board (I) constitutes a first printed circuit board;
further comprising a second printed circuit board carrying said oscillator circuit means, said second printed circuit board being mounted underneath said first part (G1) of said housing;
further comprising a hood for electrically shielding said RC oscillator circuit means.

10. Distance-frequency transducer comprising
an RC oscillator circuit including
an operational amplifier having a direct input forming an integrator circuit;
a Schmitt trigger circuit connected to the integrator circuit; and
a measuring capacitor having a capacitance (C) varying in dependence on distance, connected to said operational amplifier, for controlling the frequency thereof in dependence on the capacitance of the capacitor;
said capacitor having a fixed electrode (E1) and a ring electrode (E5) surrounding said fixed electrode, said ring electrode being connected to the direct input of the operational amplifier.

* * * * *